Patented Dec. 18, 1951

2,578,788

UNITED STATES PATENT OFFICE 2,578,788

PREPARATION OF β-TERTIARY AMINO-ACRYLIC ESTERS FROM ALKOXY-ACRYLIC ESTERS

Peter L. de Benneville, Philadelphia, Pa., assignor to Rohm & Haas Company, Philadelphia, Pa., a corporation of Delaware No Drawing. Application May 13, 1949, Serial No. 93,196

7 Claims. (Cl. 260—247.2)

This invention relates to a method for preparing tertiary β-aminoacrylates. More specifically it deals with a process for preparing esters of the formula

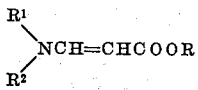

wherein R is a hydrocarbon group; preferably an alkyl group of not over four carbon atoms, $R^1$ is a methyl, ethyl, or hydroxyethyl group, $R^2$ is a hydroxyethyl group or an alkyl group of not over twelve carbon atoms, and $R^1$ and $R^2$ taken together represent a divalent saturated hydrocarbon or ether chain having four or five carbon atoms and forming jointly with the nitrogen a five- to six-membered heterocycle.

Some tertiary β-aminoacrylates have previously been made by methods which require, for starting materials, the relatively unstable sodio-derivative of a formyl acetic ester or an ester of propiolic acid. Either type of starting material is difficult to obtain.

According to the present invention, there are reacted an alkyl β-alkoxyacrylate and a basic secondary monoamine

where $R^1$ and $R^2$ represent the groups defined above, to form an above defined β-aminoacrylate.

Typical of these secondary amines are dimethylamine, diethylamine, diethanolamine, methylbutylamine, methylhexylamine, methyloctylamine, methylnonylamine, methyldodecylamine, ethylhexylamine, ethyloctylamine, ethylnonylamine, ethyldodecylamine, morpholine, thiomorpholine, piperidine, pyrrolidine, dimethylmorpholine, and 2-methylpiperidine.

The alkyl β-alkoxyacrylates are readily available through the reaction of acetylene and an alkyl carbonate in the presence of a strongly basic anhydrous catalyst, as described in application Serial No. 52,607, filed by Croxall and Schneider on October 2, 1948, now Patent No. 2,535,012, issued December 19, 1950. As catalysts, there are used alkali metal acetylides, alkali metal alcoholates, or quaternary ammonium alcoholates, such as sodium acetylide, potassium acetylide, sodium methylate, sodium ethylate, potassium butoxide, dimethyl dibenzyl ammonium methoxide, benzyl trimethyl ammonium ethoxide, etc. As carbonates, there are used dimethyl carbonate, diethyl carbonate, dipropyl carbonate, diisopropyl carbonate, dibutyl carbonate, diisobutyl carbonate, di-sec-butyl carbonate, dihexyl carbonate, dioctyl carbonate, and the like. The esterifying alcohol residue in each case is a nontertiary one; i. e., a primary or secondary group. Instead of these dialkyl carbonates, there may be used other carbonates, such as diallyl carbonate, dicyclohexyl carbonate, dibenzyl carbonate or the like. The carbonate is treated with 0.01% to 5% of its weight of an alkaline catalyst and acetylene is passed into the mixture at 20° to 110° C. When acetylene is no longer absorbed, the catalyst is destroyed, as by neutralization with an acid and the products are separated, usually by distillation under reduced pressure. There are thus obtained alkyl β-alkoxyacrylates, alkyl β,β-dialkoxypropionates, and also dialkoxysuccinates and alkoxymaleates.

The alkyl β,β-dialkoxypropionates are converted to alkyl β-alkoxyacrylates when heated with a dealcoholating catalyst, which may be an acidic or alkaline agent, such as sodium acid sulfate or sodium methylate, and a mole of alcohol is taken off per mole of propionate. This method of increasing the amount of β-alkoxy-acrylate produced is described in application Serial No. 52,608, filed by Croxall and Schneider on October 2, 1948, now Patent No. 2,571,212, issued October 16, 1951.

As typical of the above procedures, the preparation of ethyl β-ethoxyacrylate will be described. A five-liter flask, equipped with a gas-tight, stainless steel stirrer, was charged with 300 cc. of anhydrous ethanol containing a little benzene. There was dissolved therein 29 grams of sodium. Excess ethanol was removed under reduced pressure to leave sodium ethylate in the form of a dry powder. Thereto was added 2213 grams of anhydrous diethyl carbonate. The reaction flask was then equipped with gas inlet and outlet tubes and flushed with nitrogen. The mixture was heated to 80°–85° C. and acetylene was passed in at a pressure of 9–10 inches of mercury. When the absorption of acetylene became slow, the batch was cooled and acidified with dilute acetic acid. Two layers formed and were separated. The upper layer contained the organic products. It was extracted with water, dried, and distilled. After a forerun of ethyl alcohol and ethyl carbonate two fractions, (a) and (b), containing both ethyl β-ethoxyacrylate and ethyl β,β-diethoxypropionate, were obtained. Redistillation of either of these would yield the separate esters. At 94° C./16 mm. a fraction of pure ethyl β,β-diethoxypropionate was obtained. From 96 grams of fraction (a) there were obtained 62 grams of ethyl β-ethoxyacrylate, distilling at 102.5°–103° C./34 mm., when this fraction was heated with a small amount of sodium acid sulfate as catalyst and ethyl alcohol was distilled therefrom.

In the same way, other carbonate esters may be used to give ether propionates and ether acrylates. The ether propionates are converted to ether acrylates when treated with an acidic catalyst as above or with an alkaline catalyst and one mole of alcohol taken off per mole of ester.

In the present invention, the ether acrylates are mixed and reacted with secondary amines of the type and size defined above. The interchange of an alkoxy group for a di-substituted amino group occurs—a rather unusual type of reaction. A defined secondary amine and ether acrylate are mixed and heated together, usually under reflux conditions, temperatures of 25° to 125° C. being useful. The ether group forms an alcohol, ROH, which can be separated by distillation, leaving the β-aminoacrylate. The β-aminoacrylates, which have relatively small N-substituents, can generally be purified by distillation at low pressure.

Yields are often improved in this reaction by the presence of a basic catalyst in small amount, although good yields are obtained without use of such catalysts. Suitable catalysts are calcium hydroxide and potassium carbonate.

It is preferred that the reaction be performed with alkyl β-alkoxyacrylates in which the alkyl groups contain one to four carbon atoms, since the alcohol, ROH, therefrom can be readily removed by distillation. Yet the reaction is not limited thereto. The alcohols of more carbon atoms are usually separable under reduced pressures, particularly when they are hydrocarbon groups of not more than eight carbon atoms.

The ether acrylates used as reactants have the structure

ROCH=CHCOOR wherein R is a hydrocarbon group, particularly such group of not over eight carbon atoms. R is preferably an alkyl group of not over four carbon atoms.

The products of the reaction are mostly high-boiling liquids, which vary from colorless to straw-colored. They are stable under ordinary conditions, but are decomposed by dilute acid slowly in the cold to the original secondary amines in salt form and to trimesates. This reaction may be illustrated, using ethyl β-dimethylaminoacrylate and hydrochloric acid by way of example, 3(CH₃)₂NCH=CHCOOC₂H₅ + 3HCl

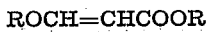

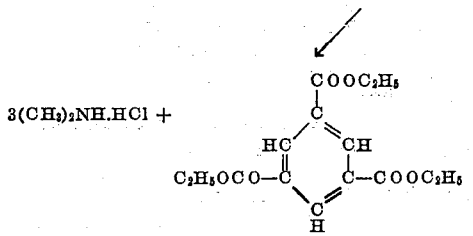

The β-aminoacrylates are weak organic bases. Since they contain along with amino group and ester linkage a reactive bond, they are useful intermediates in the preparation of a variety of compounds having potential value in the fields of pharmaceutical products and insecticides. The double bond is reducible to yield β-aminopropionates. Reduction also at the ester linkage yields tertiary β-aminopropanols. Compounds having reactive hydrogen, as in a methylene group, add to the double bond of the tertiary β-aminoacrylates.

Preparation of typical tertiary β-aminoacrylates is described in the following examples, in which parts by weight are used.

*Example 1*

A mixture of 72 parts by weight of ethyl β-ethoxyacrylate, 43 parts of morpholine, and 25 parts of anhydrous potassium carbonate was heated for two hours under reflux in a flask in an oil-bath at 120°–140° C. The reaction mixture was cooled, filtered, and distilled to yield, after removal of low-boiling fractions, 64 parts by weight of a light yellow liquid which distilled at 138°–142° C./0.8 mm. By titration with 0.1N hydrochloric acid solution to a bromphenol blue end-point, this product was found to have a neutralization equivalent of 185. The theoretical neutralization equivalent for ethyl β-morpholinoacrylate is 185. The product was found to contain 7.67% of nitrogen, corresponding to a theoretical value of 7.57% for ethyl β-morpholinoacrylate.

In a similar manner, 43 parts of ethyl β-ethoxyacrylate and 26 parts of morpholine were reacted under reflux for two hours. There were obtained on distillation at 150°–155° C./1.3 mm. 29 parts of ethyl β-morpholinoacrylate. This fraction had a neutralization equivalent of 187 (theory 185).

*Example 2*

Into a mixture of 144 parts by weight of ethyl β-ethoxyacrylate and 50 parts of potassium carbonate, there was passed 45 parts by weight of dimethylamine while the reaction mixture was stirred and maintained at 25° C. A Dry-Ice-acetone condensing system was used for recovery of dimethylamine escaping from the reaction system. The reaction mixture was then stirred and maintained at 30° C. for 1.25 hours. It was filtered and distilled. After removal of alcohol and unreacted ester, there was obtained at 81°–89° C./0.35 mm. 92 parts of ethyl β-dimethylaminoacrylate. The product was found to have a neutralization equivalent of 145 and to contain 9.32% of nitrogen. Corresponding theoretical values are 143 and 9.78%.

*Example 3*

The mixture of 34.4 parts of ethyl β-ethoxyacrylate and 12 parts of anhydrous potassium carbonate was heated to 100° C. and thereto was gradually added, with stirring, 37.5 parts of nonylmethylamine during the course of 1.25 hours. Promptly evolution of alcohol occurred with refluxing. The reaction mixture was stirred for an additional 1.5 hours and filtered to remove potassium carbonate. The filtrate was distilled. After removal of low-boiling materials, there was obtained ethyl β-nonylmethylaminoacrylate at 144°–149° C./0.3 mm. in an amount of 39 parts by weight. On analysis, this product was found to contain 5.28% of nitrogen (theory 5.48%).

*Example 4*

To a mixture of 57.6 parts of ethyl β-ethoxyacrylate and 20 parts of potassium carbonate was added dropwise with stirring at 90° C. over a 15 minute period 34 parts of piperidine. The mixture was stirred for 4 hours at 90°–100° C. and then filtered to remove potassium carbonate. On distillation there was obtained 57.5 parts of ethyl β-piperidinoacrylate, distilling at 123°–

124° C./1.1 mm. The product was found to have a neutral equivalent of 186.5 and to contain 7.62% of nitrogen. Corresponding theoretical values are 183 and 7.64% respectively.

*Example 5*

To a mixture of 19.7 parts of n-butyl β-butoxyacrylate and 8.5 parts of potassium carbonate was added dropwise at 90°–95° C. with stirring 14.8 parts of morpholine over a 20 minute period. The mixture was heated for 3.75 hours at 90°–95° C. Benzene was added to dissolve the product and the mixture filtered to remove potassium carbonate. After low-boiling materials were removed by distillation, there was obtained 13 parts of a crude product which corresponded in composition approximately to that of butyl β-morpholinoacrylate. It was distilled at 165°–175° C./2 mm. to yield 5.5 parts of butyl β-morpholinoacrylate.

*Example 6*

A mixture of 50 parts of methyl β-methoxyacrylate and 12.5 parts of anhydrous potassium carbonate was heated to 90° C. Thereto was slowly added, with stirring, over a 25 minute period, 21.75 parts morpholine. After the reaction mixture had been heated at 90° C. for 3.75 hours, it was cooled. Crystals formed. The reaction mixture was taken up in hot methanol and filtered to remove potassium carbonate. The filtrate was cooled, whereupon crystals were again formed. These were separated by filtration and were recrystallized from methanol. They then melted at 76°–78° C. Upon analysis, the crystals were found to have a neutral equivalent of 174 and a nitrogen content of 8.2%. Corresponding theoretical values for methyl β-morpholinoacrylate, the product here obtained, are 171 and 8.18% respectively.

*Example 7*

A mixture of 57.6 parts by weight of ethyl β-ethoxyacrylate and 20 parts of potassium carbonate was heated to 90°–95° C. and thereto was added, with stirring, over a period of 35 minutes, 42 parts of diethanolamine. The reaction mixture was stirred and heated at 90°–105° C. for 3.5 hours. It was filtered to remove potassium carbonate. The resulting filtrate was heated on a steam-bath under reduced pressure to remove low-boiling products. There remained 62 parts of a light amber colored liquid which was found to be decomposed when subjected to distillation. It was found to contain 7.3% of nitrogen, thus corresponding in composition to ethyl bis (β-hydroxyethyl) aminoacrylate for which the theoretical nitrogen content is 7.4%.

In place of the amines shown in the above examples, there may be reacted any of the other secondary amines falling within the general formula R¹NHR². The amines in which R¹ is methyl and R² is an alkyl group up to dodecyl compose one class of considerable interest. The heterocyclic amines in which R¹ and R² are taken together as a divalent group, such as

form another interesting class. The reaction proceeds very cleanly therewith. Furthermore, other esters than those shown above may be used in the same general way. Where a large ester group is desired, as, for example, to increase oil solubility, the 2-ethylhexyl, or 2-ethylbutyl, octyl, or nonyl groups are desirable as R.

I claim:

1. A method for preparing tertiary β-aminoacrylates of the formula

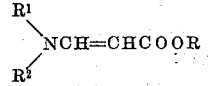

which comprises mixing together and reacting between 25° and 125° C. a secondary monoamine of the formula

and an ether acrylate

ROCH=CHCOOR wherein R is a hydrocarbon group having at least one hydrogen on the carbon atom thereof at which the said group is attached to oxygen, R¹ as an individual group is a member of the class consisting of methyl, ethyl, and hydroxyethyl groups, R² as an individual group is a member of the class consisting of the hydroxyethyl group and alkyl groups of not over 12 carbon atoms, and R¹ and R² when taken together form a member of the class consisting of the saturated divalent groups —CH₂CH₂CH₂CH₂—, —CH₂CH₂CH₂CH₂CH₂—
—CH₂CH₂OCH₂CH₂—, and —CH₂CH₂SCH₂CH₂—

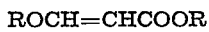

which jointly with the nitrogen form a heterocycle.

2. A method of preparing tertiary β-aminoacrylates of the formula

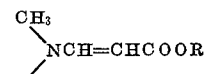

which comprises mixing together a secondary amine of the formula

and an ether acrylate of the formula

ROCH=CHCOOR and reacting them together under reflux, in the above formulas R being an alkyl group which contains not over four carbon atoms and which is attached to oxygen at a carbon atom thereof bearing at least one hydrogen atom and R² is an alkyl group of not over 12 carbon atoms.

3. A method of preparing an alkyl β-morpholinoacrylate which comprises mixing and reacting together under reflux morpholine and an ether acrylate, ROCH=CHCOOR, wherein R is a nontertiary alkyl group of not over four carbon atoms.

4. A method of preparing an alkyl β-piperidinoacrylate which comprises mixing and reacting together under reflux piperidine and an ether acrylate, ROCH=CHCOOR, wherein R is a nontertiary alkyl group of not over four carbon atoms.

5. A method of preparing ethyl β-dimethylaminoacrylate which comprises mixing and heating together under reflux ethyl β-ethoxyacrylate and dimethylamine.

6. A method of preparing ethyl β-nonylmethylaminoacrylate which comprises mixing and heating together under reflux ethyl β-ethoxyacrylate and nonylmethylamine.

7. A method of preparing ethyl bis-(β-hydroxyethyl) aminoacrylate which comprises mixing and heating together under reflux ethyl β-ethoxyacrylate and diethanolamine.

PETER L. DE BENNEVILLE.

REFERENCES CITED

The following references are of record in the file of this patent:

UNITED STATES PATENTS

| Number | Name | Date |
|---|---|---|
| 2,425,693 | Cook et al. | Aug. 12, 1947 |
| 2,439,359 | Dixon et al. | Apr. 6, 1948 |

OTHER REFERENCES

Milter et al.: Chem. Abstracts, vol. 20 (1926), p. 206.

Straus: Chem. Abstracts, vol. 21 (1927), pp. 54, 55.

Rubtsov: Chem. Abstracts, vol. 32 (1938), p. 526.

Rubtsov: Chem. Abstracts, vol. 34 (1940), p. 2845.

Price et al.: Chem. Abstracts, vol. 40 (1946) pp. 5739–5742.